US012787993B2

(12) United States Patent
Hashimoto

(10) Patent No.: US 12,787,993 B2
(45) Date of Patent: Nov. 10, 2026

(54) GUIDE RING

(71) Applicant: KYOCERA Corporation, Kyoto (JP)

(72) Inventor: Masato Hashimoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 142 days.

(21) Appl. No.: 18/283,758

(22) PCT Filed: Mar. 22, 2022

(86) PCT No.: PCT/JP2022/013291
§ 371 (c)(1),
(2) Date: Sep. 22, 2023

(87) PCT Pub. No.: WO2022/202847
PCT Pub. Date: Sep. 29, 2022

(65) Prior Publication Data

US 2024/0174479 A1 May 30, 2024

(30) Foreign Application Priority Data

Mar. 24, 2021 (JP) ................................ 2021-049668

(51) Int. Cl.
*A01K 87/04* (2006.01)
*B65H 57/06* (2006.01)

(52) U.S. Cl.
CPC ............ *A01K 87/04* (2013.01); *B65H 57/06* (2013.01)

(58) Field of Classification Search
CPC ................................ A01K 87/04; B65H 57/06
See application file for complete search history.

(56) References Cited

U.S. PATENT DOCUMENTS

| | | | |
|---|---|---|---|
| 6,067,743 A | 5/2000 | Ohmura | |
| 6,108,959 A | 8/2000 | Tsurufuji et al. | |
| 10,638,739 B2 | 5/2020 | Takenouchi et al. | |
| 2015/0201595 A1* | 7/2015 | Takenouchi | A01K 87/04 43/24 |

FOREIGN PATENT DOCUMENTS

| | | |
|---|---|---|
| JP | 57-115459 A | 7/1982 |
| JP | 10-136844 A | 5/1998 |
| JP | 10215736 A * | 8/1998 |
| JP | 2001-321031 A | 11/2001 |
| JP | 2002291378 A * | 10/2002 |
| JP | 2002361804 A * | 12/2002 |
| JP | 3104774 U * | 10/2004 |
| JP | 4290851 B2 | 7/2009 |
| WO | 2014/119522 A1 | 8/2014 |

OTHER PUBLICATIONS

JP-10215736-A Translation (Year: 1998).*
JP-2002291378-A Translation (Year: 2002).*
JP-3104774-U Translation (Year: 2004).*
JP-2002361804-A Translation (Year: 2002).*
https://en.wikipedia.org/wiki/Tridymite (Year: 2025).*
https://en.wikipedia.org/wiki/Cristobalite (Year: 2025).*

* cited by examiner

*Primary Examiner* — Kimberly S Berona
*Assistant Examiner* — Steven J Shur
(74) *Attorney, Agent, or Firm* — Procopio, Cory, Hargreaves & Savitch LLP

(57) ABSTRACT

A guide ring includes a base member and an oxide layer. The base member has a ring shape, is made of a non-oxide ceramic, and includes a recessed portion. The oxide layer contains an oxide as a main component. The recessed portion has a first surface, and the oxide layer is located on the first surface of the recessed portion.

18 Claims, 10 Drawing Sheets

GUIDE RING

CROSS-REFERENCE TO RELATED APPLICATION(S)

This application is a national stage application of International Application No. PCT/JP2022/013291, filed on Mar. 22, 2022, which designates the United States, the entire contents of which are herein incorporated by reference, and which is based upon and claims the benefit of priority to Japanese Patent Application No. 2021-049668, filed on Mar. 24, 2021, the entire contents of which are herein incorporated by reference.

TECHNICAL FIELD

The disclosed embodiment relates to a guide ring.

BACKGROUND OF INVENTION

In order to movably hold a yarn-like member (hereinafter, also referred to as a yarn), a guide ring having an annular shape is used in a fishing rod, a textile machine, or the like. The guide ring is required to have excellent slidability since the guide ring comes into contact with a yarn moving at a high speed or foreign matter such as sand attached to the yarn (see, for example, Patent Document 1).

CITATION LIST

Patent Literature

Patent Document 1: JP 10-136844 A

SUMMARY

An object of an aspect of the embodiment is to provide a guide ring having excellent slidability.

Solution to Problem

A guide ring according to an aspect of an embodiment includes a base member and an oxide layer. The base member has a ring shape, is made of a non-oxide ceramic, and includes a recessed portion. The oxide layer contains an oxide as a main component. The recessed portion includes a first surface, and the oxide layer is located on the first surface of the recessed portion.

DESCRIPTION OF EMBODIMENTS

Hereinafter, an embodiment of a guide ring disclosed in the present application will be described with reference to the accompanying drawings. The present invention is not limited by the following embodiment.

In order to movably hold a yarn-like member (hereinafter, also referred to as a yarn), a guide ring having an annular shape is used in a fishing rod, a textile machine, or the like. The guide ring is required to have excellent slidability since the guide ring comes into contact with a yarn moving at a high speed or foreign matter such as sand attached to the yarn.

If there is a problem in the slidability, a large load is applied to the yarn when the yarn moves at a high speed, and thus there is a concern that a defect such as abrasion and cutting of the yarn may occur. However, in the related art, there is room for improvement in the slidability of the guide ring.

Therefore, fabrication of the guide ring that overcomes the above-mentioned problems and is excellent in slidability is expected.

Embodiment

Figure 1:
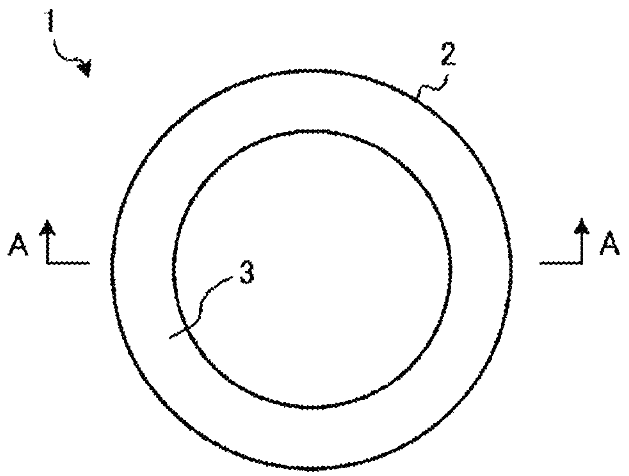
FIG. 1 is a plan view of a guide ring according to an embodiment.
Figure 2:
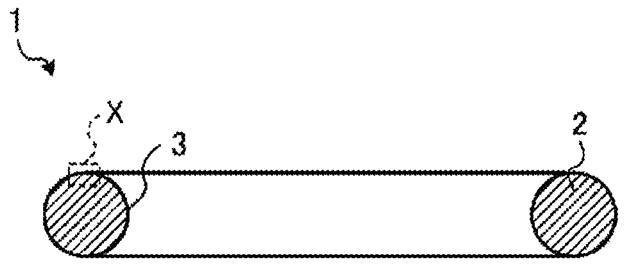
FIG. 2 is an arrow cross-sectional view taken along an A-A line illustrated in FIG. 1.

First, configurations of a guide ring, a fishing yarn guide, and a fishing rod according to the embodiment will be described with reference to FIGS. 1 to 6. FIG. 1 is a plan view of a guide ring 1 according to the embodiment, and FIG. 2 is an arrow cross-sectional view taken along an A-A line illustrated in FIG. 1.

As illustrated in FIG. 1, the guide ring 1 according to the embodiment includes a base member 2 having a ring shape, and the base member 2 includes a first surface 3. As illustrated in FIG. 2, the base member 2 has a substantially circular cross section. In the present disclosure, the cross section of the base member 2 is not limited to a substantially circular shape, and may be, for example, an elliptical shape.

Figure 4:
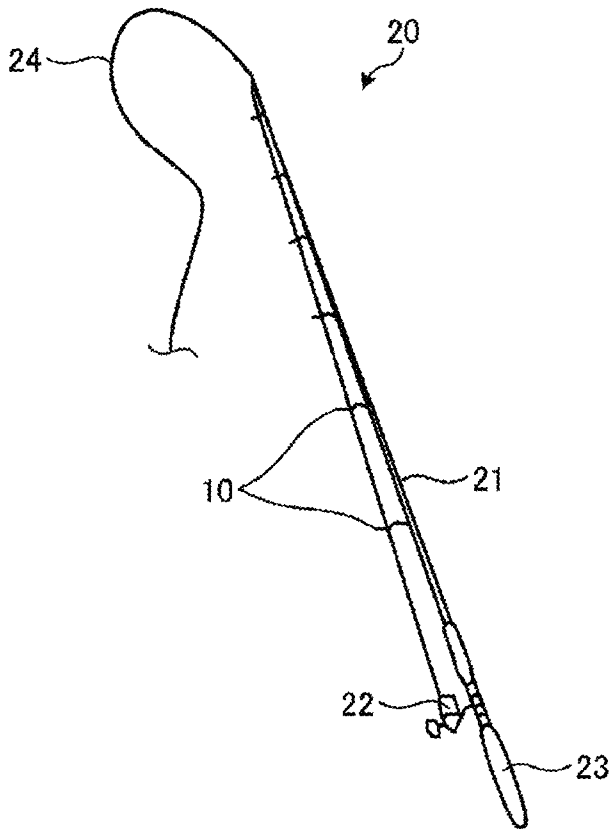
FIG. 4 is a view for explaining a configuration of a fishing rod according to the embodiment.

In the guide ring 1, a space on the inner peripheral side of the base member 2 serves as a guide hole for a yarn 24 (see FIG. 4). The yarn 24 is inserted into the space on the inner peripheral side of the base member 2 along a running direction. That is, the inner peripheral surface of the first surface 3 of the base member 2 is a contact surface of the yarn 24.

The base member 2 is made of ceramic. Examples of the ceramic constituting the base member 2 include non-oxide ceramics such as silicon carbide (SiC), silicon nitride ($Si_3N_4$), aluminum nitride (AlN), titanium nitride (TiN), and titanium carbide (TiC).

Among these, from the viewpoint of improving the slidability of the yarn 24, the base member 2 preferably contains silicon carbide or silicon nitride as a main component.

Figure 3:
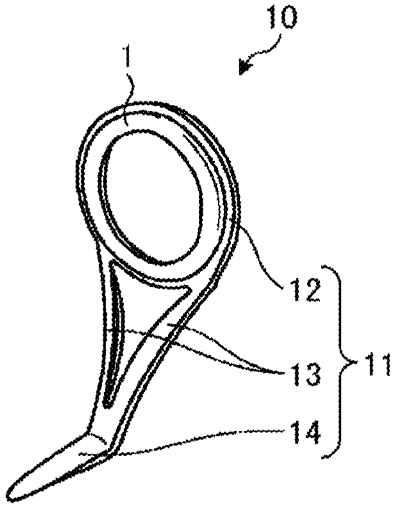
FIG. 3 is a perspective view of a fishing yarn guide according to the embodiment.

FIG. 3 is a perspective view of a fishing yarn guide 10 according to the embodiment. As illustrated in FIG. 3, the fishing yarn guide 10 according to the embodiment includes the guide ring 1 and a frame body 11. The frame body 11 includes a holding portion 12, a support portion 13, and an attachment portion 14.

The holding portion 12 holds the guide ring 1. The support portion 13 supports the holding portion 12. The attachment portion 14 attaches the support portion 13 to a fishing rod 20 (see FIG. 4). The fishing yarn guide 10 according to the embodiment is not limited to the example illustrated in FIG. 3.

FIG. 4 is a view for explaining a configuration of the fishing rod 20 according to the embodiment. As illustrated in FIG. 4, the fishing rod 20 according to the embodiment includes a rod portion 21, a reel 22, a handle portion 23, the yarn 24, and a plurality of the fishing yarn guides 10.

In this fishing rod 20, the rod portion 21 and the reel 22 are each attached to a handle portion 23. The plurality of fishing yarn guides 10 are attached to predetermined positions of the rod portion 21 connected to the handle portion 23. The yarn 24 wound around the reel 22 is inserted through the guide rings 1 (see FIG. 3) of the plurality of fishing yarn guides 10, and is led out from a tip portion of the rod portion 21.

When the fishing rod 20 is used for fishing, a tackle such as a lure, a fishhook, a weight, or a float (not illustrated) is attached to the vicinity of the tip portion of the yarn 24 pulled out from the reel 22, the rod portion 21 is swung while gripping the handle portion 23 of the fishing rod 20, and the yarn 24 wound around the reel 22 can be fed out by using the load of the tackle.

Figure 5:
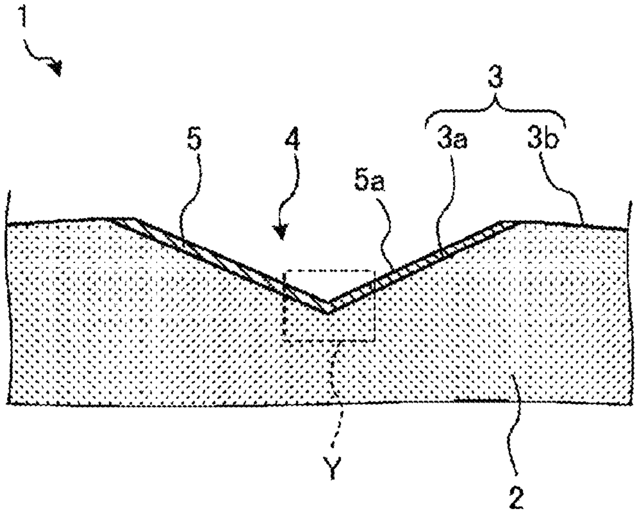
FIG. 5 is an enlarged cross-sectional view of a region X illustrated in FIG. 2.

FIG. 5 is an enlarged cross-sectional view of a region X illustrated in FIG. 2. As illustrated in FIG. 5, in the embodiment described so far, a recessed portion 4 is provided in the first surface 3 of the base member 2 in the guide ring 1. For example, a plurality of such recessed portions 4 are provided in the first surface 3. In the present disclosure, the first surface 3 includes a first surface 3*a* and a first surface 3*b*. The first surface 3*a* is a surface of the base member 2 in the recessed portion 4. On the other hand, the first surface 3*b* is a surface of the base member 2 other than the first surface 3*a*. When the recessed portion 4 is viewed from above, the shape of the recessed portion 4 may be, for example, circular or irregular. The cross-sectional shape of the recessed portion 4 may be observed, for example, in a cross section crossing the vicinity of the deepest position of the recessed portion 4.

An oxide layer 5 containing an oxide as a main component is disposed on the first surface 3*a* of the base member 2 in the recessed portion 4. For example, when the base member 2 contains silicon carbide or silicon nitride as a main component, the oxide layer 5 contains silicon oxide ($SiO_2$) as a main component.

In the embodiment, when the yarn 24 (see FIG. 4) to which seawater or fresh water adheres is wound and the seawater or fresh water adheres to the first surface 3 of the guide ring 1, the seawater or fresh water adhering to the first surface 3 is captured in the recessed portion 4 formed in the first surface 3. In addition, since a second surface 5*a* of the oxide layer 5 has high water repellency, the seawater or fresh water captured in the recessed portion 4 is quickly discharged when the yarn 24 slides on the first surface 3.

That is, in the embodiment, since the sliding on the first surface 3 is improved by the seawater or fresh water captured in the recessed portion 4, the sliding resistance of the first surface 3 can be reduced. Therefore, according to the embodiment, the guide ring 1 having excellent slidability can be fabricated.

In addition, in the embodiment, since the oxide layer 5 is disposed on the first surface 3*a* of the base member 2 in the recessed portion 4, a bottom portion 4*a* (see FIG. 6) of the recessed portion 4, which is a portion on which stress is concentrated, can be reinforced. Therefore, according to the embodiment, it is possible to suppress damage to the guide ring 1 by the stress from the outside.

Note that the recessed portions 4 in the present disclosure do not include ultrafine recessed portions that are naturally formed. The recessed portion 4 of the present disclosure is, for example, a recessed portion having a depth of 1 μm or more. In addition, the recessed portion 4 in the present disclosure is constituted by a cone-shaped tapered portion including a pair of tapered surfaces in a cross-sectional view.

In addition, in the embodiment, a groove 6 (see FIG. 7) having a width smaller than the width of the recessed portion 4 may be provided at the bottom portion of the recessed portion 4 formed by the tapered portion. As a result, seawater or fresh water can be captured by the groove 6 in addition to the recessed portion 4, and thus the amount of seawater or fresh water that can be captured can be increased.

In addition, since a capillary phenomenon occurs in the groove 6 having a narrow width, the seawater or fresh water captured in the groove 6 is discharged over a long period of time. That is, in the embodiment, since the groove 6 is provided at the bottom portion of the recessed portion 4, favorable slidability can be maintained over a long period of time.

In the present disclosure, a lateral groove 7 (see FIG. 7) or the like may be further provided on the side portion side of the groove 6. In the present disclosure, the oxide layer 5 may also be disposed on the surfaces of the groove 6 and the lateral groove 7, as in the case of the recessed portion 4. This also makes it possible to maintain favorable slidability over a long period of time.

In the embodiment, as illustrated in FIG. 5, the oxide layer 5 need not be disposed on the first surface 3*b* other than the first surface 3*a* of the recessed portion 4. In this manner, since the oxide layer 5 having a relatively high frictional resistance is not disposed on the first surface 3*b* that directly slides on the yarn 24, the sliding resistance of the first surface 3*b* can be further reduced. Therefore, according to the embodiment, the guide ring 1 having further excellent slidability can be fabricated.

Furthermore, in the embodiment, the width of the recessed portion 4 may be greater than the depth of the recessed portion 4. In other words, in a cross-sectional view of the recessed portion 4, when a line segment connecting both ends of the recessed portion 4 is set as a first virtual line segment and a line segment having the maximum length of a line segment inside the recessed portion 4 among line segments orthogonal to the first virtual line segment is set as a second virtual line segment, the first virtual line segment may be longer than the second virtual line segment.

As a result, the seawater or fresh water captured in the recessed portion 4 is easily discharged, and thus the guide ring 1 having further excellent slidability can be fabricated.

Furthermore, in the embodiment, when the recessed portion 4 is seen in a cross-sectional view, an angle formed by the pair of tapered surfaces in the recessed portion 4 may be an obtuse angle. If the tapered surface of the recessed portion 4 is uneven, the angle formed by the external tangents of the pair of tapered surfaces may be an obtuse angle in the embodiment.

As a result, the water repellency of the inside of the recessed portion 4 is enhanced, so that the guide ring 1 having further excellent slidability can be fabricated.

In the embodiment, the oxide layer 5 may include a crystal phase of at least one selected from the group consisting of cristobalite and tridymite. When the oxide layer 5 includes the crystal phase, the strength of the oxide layer 5 is improved, and thus the peeling of the oxide layer 5 can be suppressed. Therefore, according to the embodiment, favorable slidability can be maintained over a long period of time.

In addition, in the embodiment, since the oxide layer 5 includes a crystal phase of at least one selected from the group consisting of cristobalite and tridymite, the chemical bonding property with silicon carbide which is the base member 2 can be strengthened. Therefore, according to the embodiment, since the peeling of the oxide layer 5 can be further suppressed, favorable slidability can be maintained over a long period of time.

In addition, in the embodiment, since the oxide layer 5 includes the cristobalite crystal phase, the oxide layer 5 at an environmental temperature (for example, −30° C. to 50° C.) in fishing can be chemically stabilized. Therefore, according to the embodiment, since the peeling of the oxide layer 5 can be further suppressed, favorable slidability can be maintained over a long period of time.

Furthermore, in the embodiment, the oxide layer 5 may include an amorphous phase. Thus, peeling of the oxide layer 5 can be suppressed as compared with the case where the oxide layer 5 is composed of only a crystal phase.

This is because, in the case where the oxide layer 5 is made of only a crystal phase, there is a possibility that the oxide layer 5 may be peeled off due to a mismatch in crystallinity caused in the boundary region between the base member 2 and the oxide layer 5, whereas such a mismatch can be suppressed when the oxide layer 5 includes an amorphous phase.

That is, in the embodiment, since the oxide layer 5 includes an amorphous phase, the peeling of the oxide layer 5 can be suppressed, and thus favorable slidability can be maintained over a long period of time.

Furthermore, in the embodiment, the thickness of the oxide layer 5 may be smaller than the maximum crystal grain size of the base member 2. For example, in the embodiment, the thickness of the oxide layer 5 may be 5 μm or less. As a result, since the peeling of the oxide layer 5 can be suppressed, favorable slidability can be maintained over a long period of time.

Figure 6:
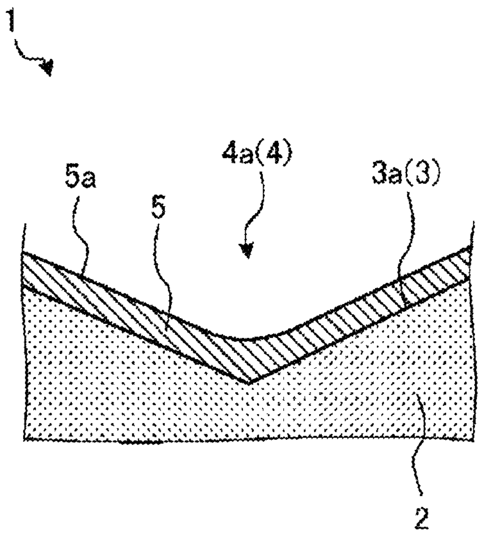
FIG. 6 is an enlarged cross-sectional view of a region Y illustrated in FIG. 5.

FIG. 6 is an enlarged cross-sectional view of the region Y illustrated in FIG. 5, and is an enlarged cross-sectional view of the bottom portion 4*a* of the recessed portion 4. As illustrated in FIG. 6, in the embodiment, at the bottom portion 4*a* of the recessed portion 4, a radius of curvature of the second surface 5*a* of the oxide layer 5 may be greater than a radius of curvature of the first surface 3*a* of the base member 2.

Thus, the concentration of stress at the bottom portion 4*a* of the recessed portion 4 can be reduced. Therefore, according to the embodiment, damage to the guide ring 1 by the stress from the outside can be further suppressed.

In addition, in the embodiment, since the oxide layer 5 includes an amorphous phase, the radius of curvature of the second surface 5*a* of the oxide layer 5 can be further increased. Therefore, according to the embodiment, damage to the guide ring 1 by the stress from the outside can be further suppressed.

EXAMPLES

An example of the present disclosure will be specifically described below. In the example described below, the guide ring 1 containing silicon carbide as a main component will be described, but the present disclosure is not limited to the following example.

First, a powder of silicon carbide as a main component and a powder of a sintering aid (for example, alumina or yttrium oxide ($Y_2O_3$)) are prepared. Then, the silicon carbide powder and the sintering aid powder are mixed at a predetermined ratio, water and a dispersant are added, and the mixture is mixed for a predetermined period of time in a ball mill, a bead mill, or the like to obtain a primary slurry.

Next, an organic binder is added to and mixed with the obtained primary slurry to obtain a secondary slurry. Then, the obtained secondary slurry is spray-dried to obtain granules containing silicon carbide as a main component.

Next, a predetermined mold is filled with the obtained granules, and they are press-molded into an annular body (ring) shape at an appropriately set pressure. Then, the obtained powder compact is fired in an argon atmosphere. Note that in the case where silicon nitride is used as a main component, the firing is preferably performed in a nitrogen atmosphere.

In this firing step, first, a temperature lower than a predetermined sintering temperature by 50° ° C. to 100° C. is held for 2 hours to 10 hours. Next, a predetermined sintering temperature is held for 1 hour to 10 hours, and then cooling is performed until a room temperature is reached, to obtain a sintered body.

Next, the obtained sintered body is subjected to primary barrel polishing. For example, the sintered body and GC (green carbon) abrasive grains as media are put in a treatment container, and the media are caused to slide on the surface of the sintered body by a wet method using water. Note that the diameter of the GC abrasive grains as the media is, for example, about 1 mm to 20 mm, and the larger the inner diameter of the guide ring 1, the larger the media to be used.

As a result, the surface of the sintered body is polished, and recessed portions are formed in the surface of the sintered body. In addition, since the media selectively and intensively slide on the open pores formed in the surface in the firing step, the open pores are deeply dug to form further recessed portions.

Next, the sintered body subjected to the primary barrel polishing is subjected to a heat treatment in an atmosphere containing oxygen (for example, air) to form an oxide layer on the surface. In the oxide layer forming step, for example, an oxidation temperature of 1000° C. to 1300° C. is held for 0.1 hours to 10 hours.

At this time, the oxidation time and the oxidation temperature are adjusted such that the oxide layer has a thickness of 5 μm or less. This makes it possible to suppress the occurrence of cracks in the oxide layer 5 in the firing step.

Thereafter, the temperature is lowered from the oxidation temperature to 500° C. at a temperature lowering rate of 60° C./hour, and further cooling is performed until a room temperature is reached, to obtain a sintered body on which the oxide layer is formed.

Next, the sintered body on which the oxide layer is formed is subjected to secondary barrel polishing. For example, the sintered body and GC (green carbon) abrasive grains as media are put in a treatment container, and the media are caused to slide on the surface of the sintered body by a wet method using water.

As a result, the surface other than the surfaces of the recessed portions is polished and most of the oxide layer is removed, while the oxide layer remains on the surfaces of the recessed portions. Finally, the sintered body subjected to the secondary barrel polishing was subjected to a cleaning treatment and a drying treatment to obtain a ring-shaped sample (guide ring 1).

Figure 7:
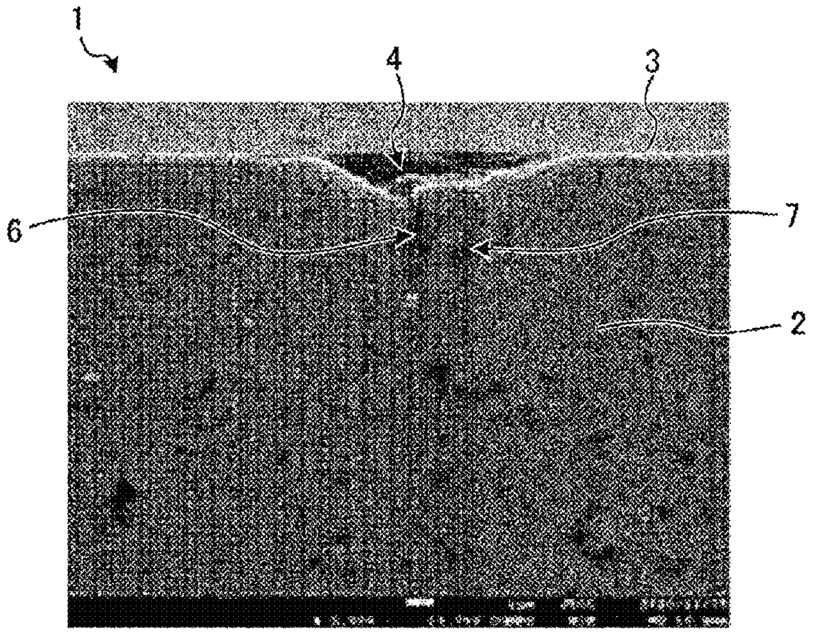
FIG. 7 is a view showing a SEM observation image of a first surface of the guide ring and the vicinity of the first surface.

Then, the obtained guide ring 1 was cut, and the first surface 3 of the cross section and the vicinity thereof were observed with a scanning electron microscope (SEM). FIG. 7 is a view showing an SEM observation image of the first surface 3 of the guide ring 1 and the vicinity of the first surface 3.

As shown in FIG. 7, on the first surface 3 of the guide ring 1, the recessed portion 4 constituted by a mortar-shaped tapered portion was observed. At the bottom portion of the recessed portion 4, the groove 6 having a width narrower than a width of the recessed portion 4 was observed. Furthermore, the lateral groove 7 was observed on the side portion side of the groove 6.

In addition, the concentration distribution of each constituent element in the same site as the site where the SEM observation was performed was measured using an electron probe micro analyzer (EPMA).

Figure 8:
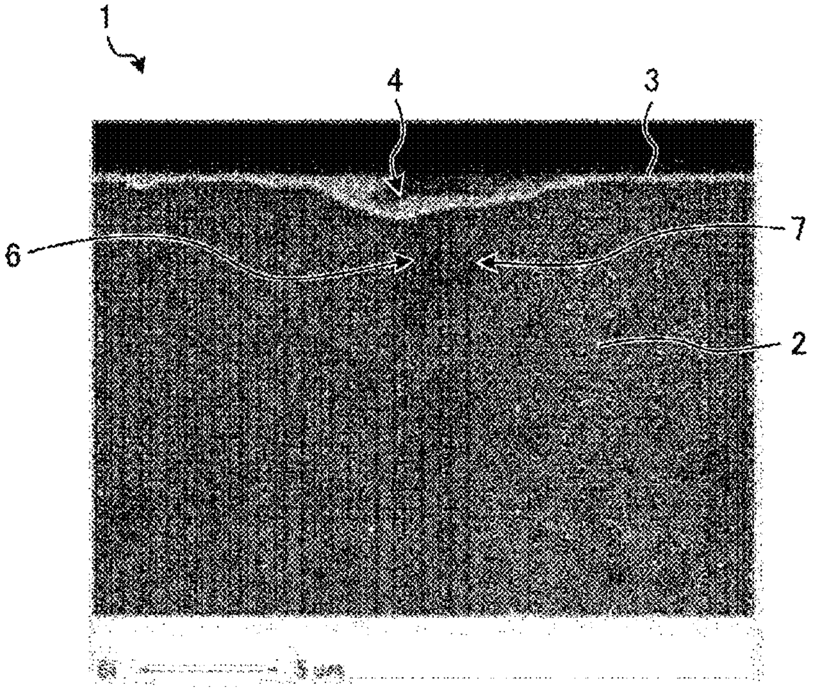
FIG. 8 is a view showing a concentration distribution of silicon of the first surface of the guide ring and the vicinity of the first surface.
Figure 9:
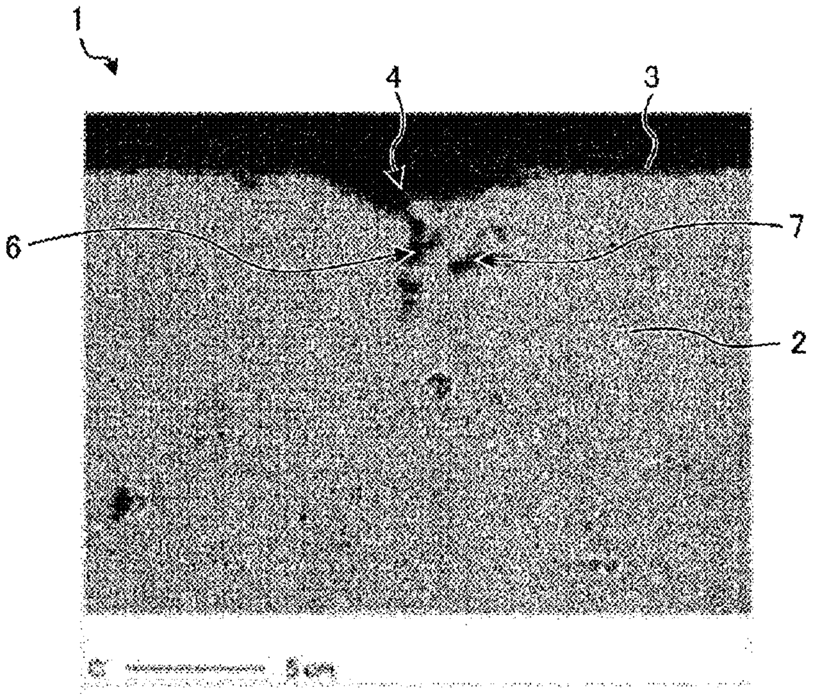
FIG. 9 is a view showing a concentration distribution of carbon of the first surface of the guide ring and the vicinity of the first surface.
Figure 10:
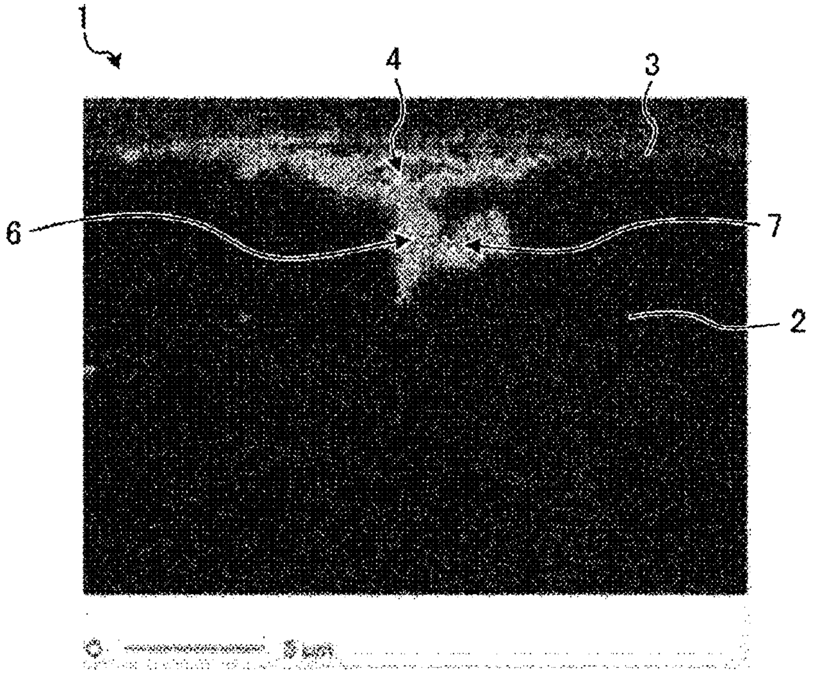
FIG. 10 is a view showing a concentration distribution of oxygen of the first surface of the guide ring and the vicinity of the first surface.

FIGS. 8 to 10 are images showing the concentration distributions of silicon, carbon, and oxygen of the first surface 3 of the guide ring 1 and the vicinity of the first surface 3. In FIGS. 8 to 10, a higher luminance indicates a higher concentration of the constituent element, and a lower luminance indicates a lower concentration of the constituent element. High luminance can also be referred to as white, for example. Low luminance can also be referred to as black, for example.

As shown in FIGS. 8 to 10, in the guide ring 1, an oxide layer, that is, silicon and oxygen were observed on the surface of the recessed portion 4, the surface of the groove 6, and the surface of the lateral groove 7.

On the other hand, the oxide layer was hardly observed on the first surface **3*b* of the base member 2 other than the recessed portion 4 (see FIG. 5). This is because almost no oxygen atom contained in the oxide layer was observed on the first surface 3*b* of the base member 2 other than the recessed portion 4**.

The embodiment according to the present invention has been described above. However, the present invention is not limited to the embodiment described above, and various modifications can be made without departing from the essential spirit of the present invention. For example, in the above-described embodiment, an example in which the guide ring 1 is applied to the fishing rod 20 has been described, but the guide ring 1 may be applied to various products other than the fishing rod.

For example, the guide ring 1 according to the embodiment may be applied to a textile machine. In this case, since the oil applied to fibers in advance for the purpose of improving the slidability can be captured in the recessed portion 4 of the first surface 3, the slidability of the first surface 3 can be further improved.

Additional effects and other aspects can be easily derived by a person skilled in the art. Thus, a wide variety of aspects of the present invention are not limited to the specific details and a representative embodiment represented and described above. Accordingly, various changes are possible without departing from the spirit or scope of the general inventive concepts defined by the appended claims and their equivalents.

REFERENCE SIGNS

1 Guide ring
2 Base member
3, **3*a*, 3*b*** First surface
4 Recessed portion
5 Oxide layer
**5*a*** Second surface
6 Groove

The invention claimed is:

1. A guide ring comprising:
a base member having a ring shape defining an inner peripheral surface, the base member being made of a non-oxide ceramic, and comprising a recessed portion formed in the inner peripheral surface; and
an oxide layer that includes an oxide of an element that is contained in the non-oxide ceramic, wherein
the recessed portion comprises a pair of tapered surfaces forming a cone-shaped portion, and
the oxide layer is located on the pair of tapered surfaces of the recessed portion.

2. The guide ring according to claim 1, wherein
at a bottom portion of the recessed portion, a radius of curvature of a second surface of the oxide layer is greater than a radius of curvature of a first surface of the base member.

3. The guide ring according to claim 1, wherein
the recessed portion is configured to capture water adhering to the inner peripheral surface, and a width of the recessed portion is greater than a depth of the recessed portion.

4. The guide ring according to claim 3, wherein
a groove having a width smaller than the width of the recessed portion is provided at the bottom portion of the recessed portion.

5. The guide ring according to claim 1, wherein
in a cross-sectional view of the recessed portion, an angle formed by the pair of tapered surfaces is an obtuse angle.

6. The guide ring according to claim 1, wherein
the oxide layer is formed by oxidizing the non-oxide ceramic of the base member, and the oxide layer comprises a crystal phase of at least one selected from the group consisting of cristobalite and tridymite.

7. A guide ring comprising:
a base member having a ring shape defining an inner peripheral surface, the base member being made of a non-oxide ceramic, and comprising a recessed portion formed in the inner peripheral surface; and
an oxide layer consisting essentially of silicon oxide, wherein
the recessed portion comprises a first surface, and
the oxide layer is located on the first surface of the recessed portion.

8. The guide ring according to claim 7, wherein
at a bottom portion of the recessed portion, a radius of curvature of a second surface of the oxide layer is greater than a radius of curvature of a first surface of the base member.

9. The guide ring according to claim 7, wherein
the recessed portion is configured to capture water adhering to the inner peripheral surface, and a width of the recessed portion is greater than a depth of the recessed portion.

10. The guide ring according to claim 9, wherein
a groove having a width smaller than the width of the recessed portion is provided at the bottom portion of the recessed portion.

11. The guide ring according to claim 7, wherein in a cross-sectional view of the recessed portion, an angle formed by a pair of tapered surfaces in the recessed portion is an obtuse angle.

12. The guide ring according to claim 7, wherein the oxide layer is formed by oxidizing the non-oxide ceramic of the base member, and the oxide layer comprises a crystal phase of at least one selected from the group consisting of cristobalite and tridymite.

13. A guide ring comprising:

a base member having a ring shape defining an inner peripheral surface, the base member being made of a non-oxide ceramic, and comprising a recessed portion formed in the inner peripheral surface; and an oxide layer consisting essentially of silicon oxide, wherein the recessed portion comprises a pair of tapered surfaces forming a cone-shaped portion, and the oxide layer is located on the pair of tapered surfaces of the recessed portion.

14. The guide ring according to claim 13, wherein at a bottom portion of the recessed portion, a radius of curvature of a second surface of the oxide layer is greater than a radius of curvature of a first surface of the base member.

15. The guide ring according to claim 13, wherein the recessed portion is configured to capture water adhering to the inner peripheral surface, and a width of the recessed portion is greater than a depth of the recessed portion.

16. The guide ring according to claim 15, wherein a groove having a width smaller than the width of the recessed portion is provided at the bottom portion of the recessed portion.

17. The guide ring according to claim 13, wherein in a cross-sectional view of the recessed portion, an angle formed by the pair of tapered surfaces is an obtuse angle.

18. The guide ring according to claim 13, wherein the oxide layer is formed by oxidizing the non-oxide ceramic of the base member, and the oxide layer comprises a crystal phase of at least one selected from the group consisting of cristobalite and tridymite.

* * * * *